US012572784B2

(12) United States Patent
Sakemi et al.

(10) Patent No.: US 12,572,784 B2
(45) Date of Patent: Mar. 10, 2026

(54) NEURAL NETWORK DEVICE, FIRING TIMING CALCULATION METHOD, AND RECORDING MEDIUM

(71) Applicants: NEC Corporation, Tokyo (JP); The University of Tokyo, Tokyo (JP)

(72) Inventors: Yusuke Sakemi, Tokyo (JP); Kazuyuki Aihara, Tokyo (JP)

(73) Assignees: NEC CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 688 days.

(21) Appl. No.: 18/004,193

(22) PCT Filed: Apr. 19, 2021

(86) PCT No.: PCT/JP2021/015878
§ 371 (c)(1),
(2) Date: Jan. 4, 2023

(87) PCT Pub. No.: WO2022/018916
PCT Pub. Date: Jan. 27, 2022

(65) Prior Publication Data
US 2023/0244918 A1 Aug. 3, 2023

(30) Foreign Application Priority Data
Jul. 20, 2020 (JP) ................................. 2020-124065

(51) Int. Cl.
G06N 3/06 (2006.01)
G06N 3/049 (2023.01)
G06N 3/063 (2023.01)

(52) U.S. Cl.
CPC ............. *G06N 3/049* (2013.01); *G06N 3/063* (2013.01)

(58) Field of Classification Search
CPC ........... G06N 3/049; G06N 3/063; G06N 3/06
USPC .......................................................... 706/15
See application file for complete search history.

(56) References Cited

U.S. PATENT DOCUMENTS

2015/0347897 A1* 12/2015 Modha ................. G06N 3/0499
706/27
2018/0357529 A1 12/2018 Song et al.
2020/0143229 A1* 5/2020 Van Der Made .... G06N 3/0464
2021/0232930 A1* 7/2021 Alakuijala ............. G06N 3/049

FOREIGN PATENT DOCUMENTS

JP 2017-134821 A 8/2017

OTHER PUBLICATIONS

International Search Report of PCT/JP2021/015878 dated Jun. 22, 2021 [PCT/ISA/210].

* cited by examiner

*Primary Examiner* — Jude Jean Gilles
(74) *Attorney, Agent, or Firm* — Sughrue Mion, PLLC

(57) ABSTRACT
A neural network device narrows down, from among respective time segments from when a spike is received to when a next spike is received, a candidate of a time segment including a firing timing of a spiking neuron, a membrane potential of the spiking neuron during a period from when a spike is received to when a next spike is received being represented by a monotonic function of time, a firing condition of the spiking neuron being represented by a comparison between the membrane potential and a threshold.

7 Claims, 6 Drawing Sheets

NEURAL NETWORK DEVICE, FIRING TIMING CALCULATION METHOD, AND RECORDING MEDIUM

CROSS REFERENCE TO RELATED APPLICATIONS

This application is a National Stage of International Application No. PCT/JP2021/015878 filed on Apr. 19, 2021, claiming priority based on Japanese Patent Application No. 2020-124065 filed on Jul. 20, 2020.

TECHNICAL FIELD

The present invention relates to a neural network device, a firing timing calculation method, and a recording medium.

BACKGROUND ART (Spiking Neural Networks)

One form of neural network is a spiking neural network (SNN), such as a feed-forward spiking neural network or a recurrent spiking neural network. In a spiking neural network, spiking neuron models are connected to form a network. The spiking neuron models are also referred to as spiking neurons, or simply neurons.

A spiking neuron model simulates multi-input signal integration and spike generation by the cell body of a biological neuron. Spike generation is also referred to as firing. The connections between spiking neuron models have a preceding level-subsequent level relationship. When the spiking neuron model on the preceding level side fires, a spike is transmitted to the spiking neuron model on the subsequent level side.

(Description of Spiking Neuron Model)

A spiking neuron model has a membrane potential as an internal state, and is a model in which the membrane potential evolves over time. A leaky integrate-and-fire neural network is known as a general spiking neuron model, in which the membrane potential evolves over time according to a differential equation such as equation (1).

[Equation 1]

$$\frac{d}{dt}v(t) = -\alpha_{leak}v(t) + I(t), \; I(t) = \sum_j w_j r\left(t - t_j^{rec}\right) \quad (1)$$

Here, v represents the membrane potential of a spiking neuron. $\alpha_{leak}$ is a constant coefficient representing the magnitude of the leak in a leaky integrate-and-fire model. I represents the postsynaptic current of a spiking neuron. $w_j$ is a coefficient that represents the strength of the connection to a spiking neuron, and is referred to as a connection weight. t represents time. $t_j^{rec}$ represents the arrival timing of a spike from the jth spiking neuron among the spiking neurons in the preceding level with respect to the spiking neuron represented by equation (1). $r(\cdot)$ is a function representing the effect a spike transmitted from a spiking neuron in the preceding level has on the postsynaptic current.

When the membrane potential reaches a predetermined threshold, the spiking neuron fires.

FIG. 11 is a diagram showing an example of the relationship between the time evolution of the membrane potential of a spiking neuron and a threshold. The horizontal axis of the graph in FIG. 11 represents time, and the vertical axis represents the potential.

The line L1001 represents the membrane potential. $V_{th}$ represents the threshold of the membrane potential. $V_{reset}$ represents the reset value of the membrane potential. $t^{rec}_1$ represents the arrival timing of a spike from the first spiking neuron among the spiking neurons in the preceding level with respect to the spiking neuron represented by FIG. 11. $t^{rec}_2$ represents the arrival timing of a spike from the second spiking neuron. $t^{rec}_3$ represents the arrival timing of a spike from the third spiking neuron.

In the example of FIG. 11, the spiking neuron fires when the membrane potential reaches the threshold $V_{th}$. That is to say, the spiking neuron generates a spike. Then, the membrane potential v returns to the reset value $V_{reset}$. Furthermore, the generated spike is transmitted to the spiking neurons in the subsequent level with respect to the spiking neuron shown in FIG. 11.

At both the spike arrival at time $t^{rec}_1$ and the spike arrival at time $t^{rec}_3$, the membrane potential v has not reached the threshold $V_{th}$. On the other hand, at the spike arrival at time $t^{rec}_2$, the membrane potential v reaches the threshold $V_{th}$ and then immediately drops to the reset value $V_{reset}$.

Moreover, Patent Document 1 describes a technique relating to the firing of a spiking neuron model. Specifically, Patent Document 1 describes a technique where, in order to prevent instability of the neuron due to the low threshold of the membrane potential when the threshold of the membrane potential of a neuron is low, the synaptic weight corresponding to each neuron is increased instead of lowering the threshold of membrane potential of the neuron.

Prior Art Documents

Patent Documents

Patent Document 1: Japanese Unexamined Patent Application, First Publication No. 2017-134821

SUMMARY OF THE INVENTION

Problems to be Solved by the Invention

It is preferable that the calculation load of the firing timing of a spiking neuron is light.

The present invention has an object of providing a neural network device, a firing timing calculation method, and a recording medium that are capable of solving the problem described above.

Means for Solving the Problem

According to a first example aspect of the present invention, a neural network device includes: a firing timing calculation means that narrows down, from among respective time segments from when a spike is received to when a next spike is received, a candidate of a time segment including a firing timing of a spiking neuron, a membrane potential of the spiking neuron during a period from when a spike is received to when a next spike is received being represented by a monotonic function of time, a firing condition of the spiking neuron being represented by a comparison between the membrane potential and a threshold.

According to a second example aspect of the present invention, a firing timing calculation method includes: narrowing down, from among respective time segments from when a spike is received to when a next spike is received, a candidate of a time segment including a firing timing of a spiking neuron, a membrane potential of the spiking neuron during a period from when a spike is received to when a next spike is received being represented by a monotonic function of time, a firing condition of the spiking neuron being represented by a comparison between the membrane potential and a threshold.

According to a third example aspect of the present invention, a recording medium stores a program for causing a computer to execute: narrowing down, from among respective time segments from when a spike is received to when a next spike is received, a candidate of a time segment including a firing timing of a spiking neuron, a membrane potential of the spiking neuron during a period from when a spike is received to when a next spike is received being represented by a monotonic function of time, a firing condition of the spiking neuron being represented by a comparison between the membrane potential and a threshold.

Effects of Invention

According to the present invention, the calculation load of the firing timing of a spiking neuron can be relatively lightened.

EXAMPLE EMBODIMENT

Hereunder, example embodiments of the present embodiment will be described. However, the following example embodiments do not limit the invention according to the claims. Furthermore, all combinations of features described in the example embodiments may not be essential to the solution means of the invention.

(Configuration of Neural Network System According to Example Embodiment)

Figure 1:
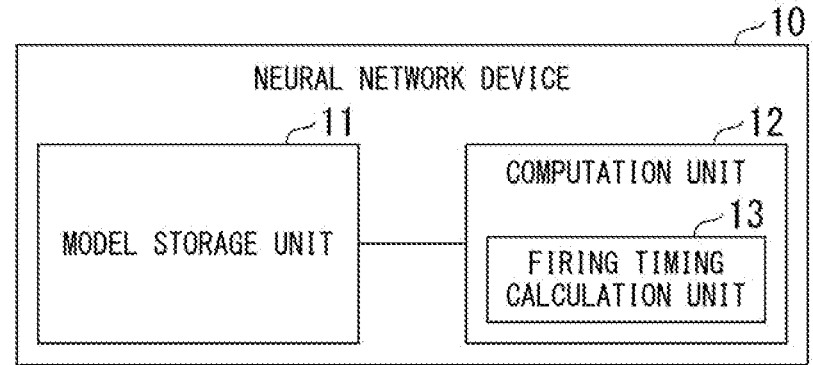
FIG. 1 is a diagram showing an example of a schematic configuration of a neural network device according to an example embodiment.

FIG. 1 is a diagram showing an example of a schematic configuration of a neural network device according to an example embodiment. In the configuration shown in FIG. 1, the neural network device 10 includes a model storage unit 11 and a computation unit 12. The computation unit 12 includes a firing timing calculation unit 13.

The neural network device 10 performs information processing using a spiking neural network.

The spiking neural network referred to here is a neural network in which spikes are transmitted between spiking neurons. The spike referred to here is a signal that is transmitted from a spiking neuron that outputs the spike to a spiking neuron that receives the input, and is a signal in which a concept exists of an arrival timing to the spiking neuron that receives the input. For example, the spike may be configured as a pulse signal or as a step signal, but is not limited to these.

The spiking neuron referred to here is a neuron in which:
(1) a concept exists of a membrane potential that evolves over time;
(2) the time evolution of the membrane potential of the spiking neuron depends on the arrival timing to the spiking neuron of a spike that is input to the spiking neuron, and a weighting coefficient set to the transmission pathway that the spike passes through; and
(3) a comparison of the membrane potential and a threshold determines whether or not the spiking neuron fires (that is to say, whether or not a spike is output), and a firing timing is determined when firing occurs.

The processing performed by the neural network device 10 can be the various processing that can be performed using a spiking neural network. For example, the neural network device 10 may perform image recognition, biometric authentication, or numerical prediction, but is not limited to these.

The model storage unit 11 stores a spiking neural network model. The spiking neural network model stored in the model storage unit 11 can have various structures and various scales. For example, the spiking neural network model stored in the model storage unit 11 may be configured in the form of a feed-forward spiking neural network, or may be configured in the form of a recurrent spiking neural network.

A spiking neural network model is also simply referred to as a neural network model. The spiking neural network model stored in the model storage unit 11 is also referred to as a target model.

Figure 2:
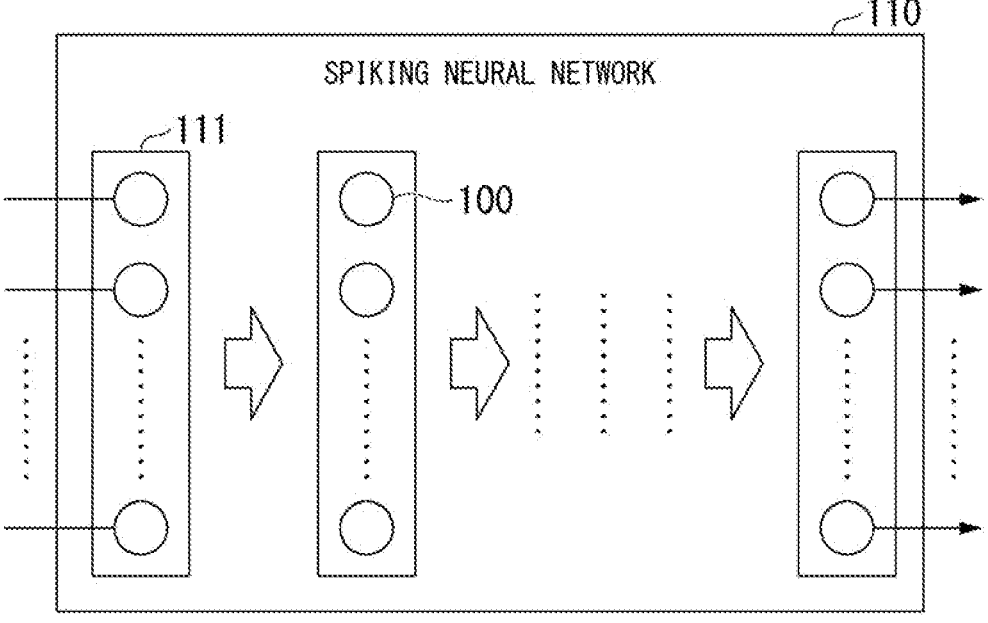
FIG. 2 is a diagram showing a first example of a schematic configuration of a target model according to the example embodiment.

FIG. 2 is a diagram showing a first example of a schematic configuration of a target model. FIG. 2 shows an example where the target model is configured as a feed-forward spiking neural network.

The feed-forward network referred to here is a form of network in which connections exist from layer to layer, and the information transmission is in one direction. Each layer of a feed-forward spiking neural network is configured by one or more spiking neurons, and there are no connections between the spiking neurons in the same layer.

In the example of FIG. 2, the spiking neural network 110, which corresponds to an example of a target model, includes a plurality of spiking neurons 100 and connections between the spiking neurons. Furthermore, the spiking neurons 100 form a plurality of layers 111. The spiking neural network 110 accepts an input and returns an output.

Figure 3:
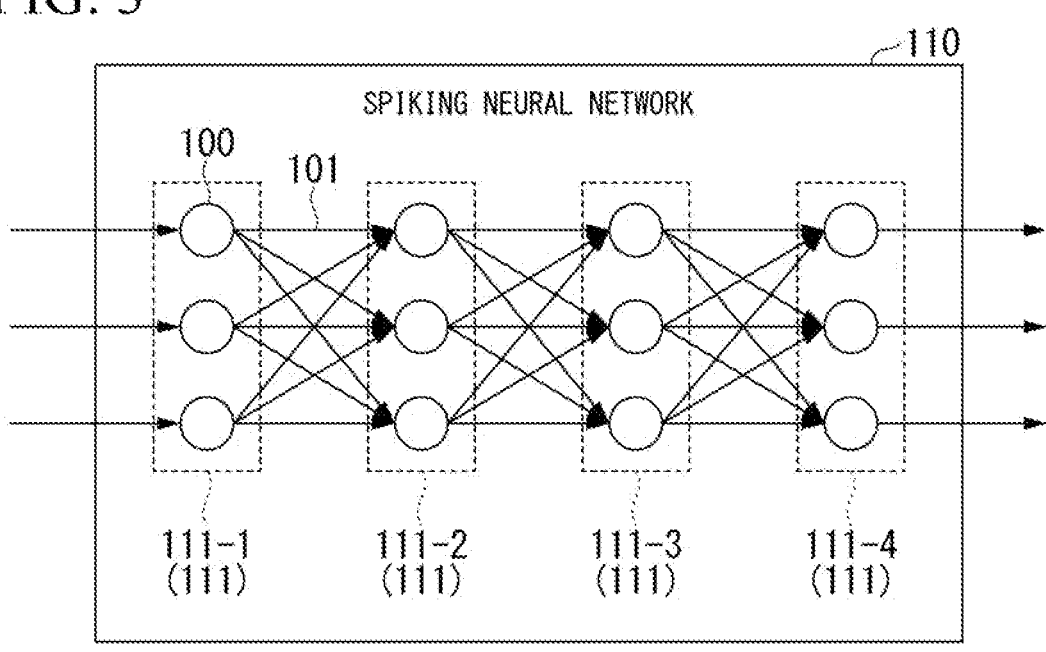
FIG. 3 is a diagram showing a second example of a schematic configuration of a target model according to the example embodiment.

FIG. 3 is a diagram showing a second example of a schematic configuration of a target model. FIG. 3 shows a more detailed example of a target model when configured as a feed-forward spiking neural network described with reference to FIG. 2. Specifically, FIG. 3 shows an example where the target model is configured as a four-layer feed-forward spiking neural network, and each layer has three spiking neurons.

In the example of FIG. 3, the spiking neural network 110, which corresponds to an example of a target model, includes four layers 111. Each of the layers 111 includes three spiking neurons 100. When distinguishing the four layers 111, the layers are referred to as the layer 111-1, the layer 111-2, the layer 111-3, and the layer 111-4 in order from the preceding level side (data input side).

Furthermore, between two adjacent layers 111, each of the spiking neurons 100 in the preceding level layer 111 and each of the spiking neurons 100 in the subsequent level layer 111 are connected. When a spiking neuron 100 in the preceding level layer 111 fires, the spike is input to the connected spiking neurons 100 in the subsequent level layer 111 after being multiplied by a connection weight.

In FIG. 3, the connections between the spiking neurons 100 are represented by transmission pathways 101. The transmission pathways 101 correspond to a simulation of nerve axons and synapses.

In the case of a feed-forward network, the first layer 111 of the spiking neural network 110 (the layer 111-1 in the example of FIG. 3) is referred to as an input layer, which accepts a signal input from the outside of the spiking neural network 110. The last layer 111 (the layer 111-4 in the example of FIG. 3) is referred to as an output layer, which outputs a signal to the outside of the spiking neural network 110. The layers between the input layer and the output layer (the layers 111-2 and 111-3) are referred to as hidden layers or intermediate layers.

However, when the target model is configured as a feed-forward spiking neural network, the number of layers is not limited to four, and may be two or more. Furthermore, the number of spiking neurons included in each layer is not limited to a specific number, and each layer may include one or more spiking neurons. Each layer may have the same number of spiking neurons, or different layers may have a different number of spiking neurons. Moreover, between adjacent layers, all of the spiking neurons in the preceding level layer 111 and all of the spiking neurons in the subsequent level layer 111 do not have to be connected.

Figure 4:
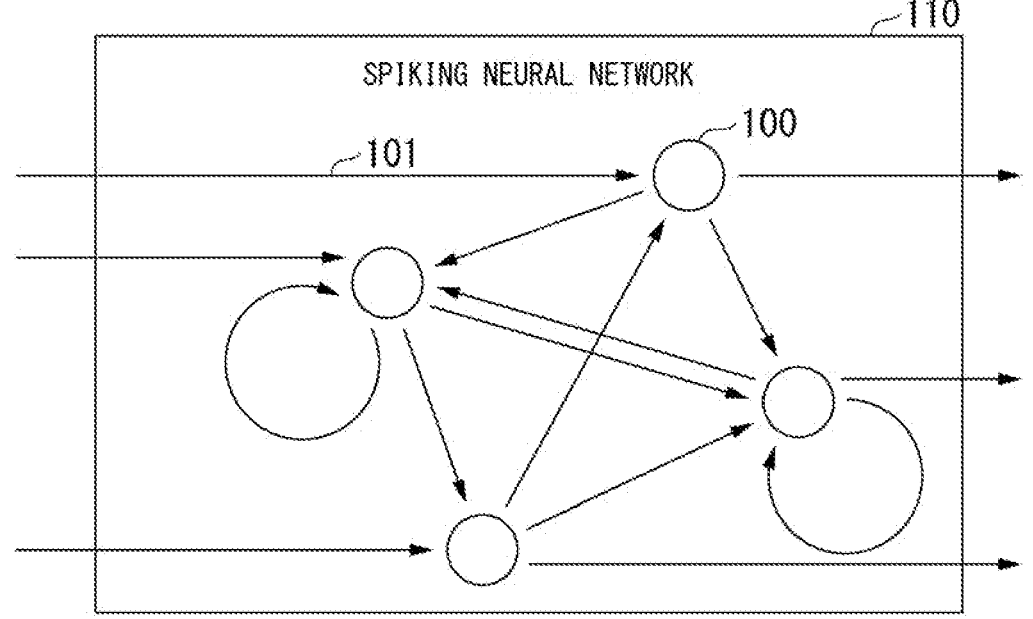
FIG. 4 is a diagram showing a third example of a schematic configuration of a target model according to the example embodiment.

FIG. 4 is a diagram showing a third example of a schematic configuration of a target model. FIG. 4 shows an example where the target model is configured as a recurrent spiking neural network.

The recurrent network referred to here is a form of network, and is a network having recursive connections. The configuration of a recurrent spiking neural network is a configuration that includes a case where a spike generated by a certain spiking neuron is directly input into itself, or a case where the spike is input into itself via another spiking neuron. Alternatively, a single recurrent spiking neural network may include both a case where a spike generated by a certain spiking neuron is directly input into itself, and a case where the spike is input into itself via another spiking neuron.

In the example of FIG. 4, the spiking neural network 110, which corresponds to an example of a target model, includes a plurality of spiking neurons 100 and connections between the spiking neurons 100. These connections can exist from any spiking neuron to any spiking neuron, and can serves as a connection to an output source spiking neuron itself.

Like the case of FIG. 3, in FIG. 4, the connections between the spiking neurons 100 are represented by transmission pathways 101.

However, the number of spiking neurons included in the target model when configured as a recurrent spiking neural network is not limited to a specific number, and may be one or more.

Figures 5, 6:
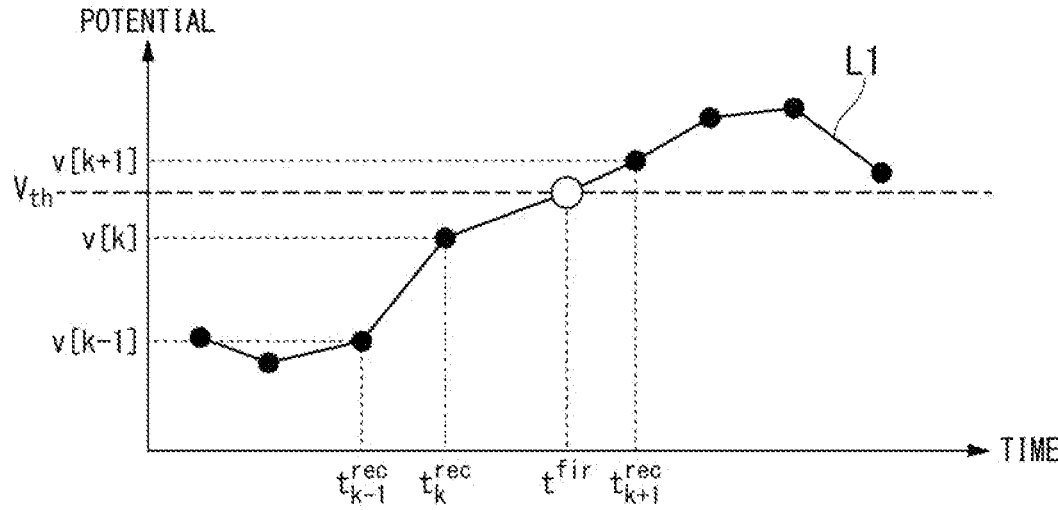
FIG. 5 is a diagram for describing a spiking neuron 100 included in a target model according to an example embodiment.
FIG. 6 is a diagram showing, for a spiking neuron according to the example embodiment, an example of time evolution of a membrane potential in the case of a monotonic change within each time segment.

FIG. 5 is a diagram for describing a spiking neuron 100 included in a target model.

The spiking neuron 100 receives data inputs (spikes weighted by connection weights) from one or more other spiking neurons 100 via the connections indicated by the transmission pathways 101 in FIG. 5. In addition, the spiking neuron 100 may also receive a data input from the spiking neuron 100 itself.

A spiking neuron 100 configured as an input node accepts data inputs (input data) from outside the target model in addition to, or instead of, inputting data from one or more other spiking neurons 100 or the spiking neuron 100 itself.

Furthermore, the spiking neuron 100 outputs data (spikes) to one or more other spiking neurons 100 via the connections indicated by the transmission pathways 101 in FIG. 5. Further, the spiking neuron 100 may also output data to the spiking neuron 100 itself. The spikes output by the spiking neuron 100 are multiplied by connection weights and input to the spiking neurons 100 serving as transmission destinations.

A spiking neuron 100 configured as an output node outputs data (output data) to the outside of the target model in addition to, or instead of, outputting data to one or more other spiking neurons 100 or the spiking neuron 100 itself.

Of the two connected spiking neurons 100, the spiking neuron 100 that outputs the spike is also referred to as a preceding level spiking neuron 100. The spiking neuron 100 that receives the spike input is also referred to as a subsequent level spiking neuron 100.

In the target model, the connections between the spiking neurons 100 may be represented by an equation that calculates the potential of the spike input to the subsequent level spiking neuron 100 by multiplying the potential of the spike output by the preceding level spiking neuron 100 by a weighting coefficient (connection weighting) that can be set and learned for each connection.

In at least one of the spiking neurons 100 among the spiking neurons 100 (the spiking neurons included in the target model), the membrane potential in time segments from when a spike is received to when the next spike is received is represented by a monotonic function of time. The time segment referred to here is the time from a given time to another given time.

At least one of the spiking neurons 100 for which the membrane potential in time segments from when a spike is received to when the next spike is received is represented by a monotonic function of time, is treated as the spiking neuron 100 subjected to calculation of a firing timing by the firing timing calculation unit 13.

The membrane potential in time segments from when a spike is received to when the next spike is received may be represented by a monotonic function of time for all of the spiking neurons 100 included in the target model. Furthermore, the firing timing calculation unit 13 may calculate the firing timing of all of the spiking neurons 100 included in the target model.

The computation unit 12 performs information processing by calculating the target model. Specifically, the computation unit 12 uses the firing timing calculation unit 13 to calculate the firing timings of the spiking neurons included in the target model. The computation unit 12 treats a calculated firing timing as the arrival timing of the spikes to the subsequent level spiking neurons of the spiking neuron, which is reflected in the calculation of the firing timings of the subsequent level spiking neurons. Moreover, the computation unit 12 outputs the calculation results of the firing timings of the output layer of the target model, as the output of the target model.

It is assumed that a spike generated by the preceding level spiking neuron of two connected spiking neurons is immediately transmitted to the subsequent level spiking neuron. As a result, the firing timing of the preceding level spiking neuron can also be used as the arrival timing of the spike at the subsequent level spiking neuron.

Alternatively, in the case of a target model for which this condition does not hold, the computation unit 12 may calculate the time required for transmission of the spike.

The computation unit 12 may additionally perform learning of the target model. That is to say, the computation unit 12 may adjust the model parameter values, such as the connection weights between the spiking neurons included in the target model.

The firing timing calculation unit 13 calculates the firing timings of the spiking neurons included in the target model. The firing timing calculation unit 13 corresponds to an example of a firing timing calculation means.

The calculation result of a firing timing by the firing timing calculation unit 13 may indicate no firing. A no firing calculation result indicates that the spiking neuron subjected to the firing timing calculation does not fire within the target period of the firing timing calculation.

(Firing Timing Calculation Method of Neural Network Device According to Example Embodiment)

The calculation of a firing time of a spiking neuron by the firing timing calculation unit 13 will be further described. One of the spiking neurons for which the firing timing calculation unit 13 calculates the firing time is referred to as the target spiking neuron. The spiking neurons that are connected to the target spiking neuron and output spikes to the target spiking neuron are referred to as preceding level spiking neurons. The spiking neurons that are connected to the target spiking neuron and receive spikes from the target spiking neuron as inputs are referred to as subsequent level spiking neurons.

As mentioned above, the target spiking neuron is subjected to the condition that the membrane potential in time segments from the time when a spike is received to the time when the next spike is received is represented by a monotonic function.

The monotonic function here may be a broadly defined monotonically increasing function, a strictly monotonically increasing function, a broadly defined monotonically decreasing function, or a strictly monotonically decreasing function. The membrane potential may be represented by a different type of monotonic function among the four types of monotonic functions mentioned above depending on the time segment from the time the target spiking neuron receives a spike to the time when it receives the next spike. For example, the membrane potential may monotonically increase in a certain time segment, and monotonically decrease in another certain time segment.

An example of a target spiking neuron that satisfies the condition that the membrane potential in time segments from the time when the spiking neuron receives a spike to the time it receives the next spike is represented by a monotonic function is represented by equation (2).

[Equation 2]

$$\frac{d}{dt}v(t) = \sum_{j=1}^{N} w_j \theta\left(t - t_j^{rec}\right) \qquad (2)$$

N represents the number of connections to the target spiking neuron. $w_j$ represents the connection weight relating to the jth connection. $t^{rec}_j$ represents the arrival timing of the spike input by the jth connection.

Here, a case is considered in which there is at most one spike input at each connection. The "j" in $t^{rec}_j$ is identification information for identifying a connection. Furthermore, because at most one spike is input to the spiking neuron from a single connection, the "j" in $t^{rec}_j$ also functions as identification information for identifying a spike. The "j" that serves as the identification information for identifying a spike is also referred to as a spike index. A case where a plurality of spikes are input from a single connection can be considered in the same way by associating an index with each spike.

θ is a step function and is expressed as in equation (3).

[Equation 3]

$$\theta(t) = \begin{cases} 1, & t \geq 0 \\ 0, & t < 0 \end{cases} \qquad (3)$$

The analytical solution of equation (2) is expressed as in equation (4).

[Equation 4]

$$v(t) = \sum_{j=1}^{N} w_j\left(t - t_j^{rec}\right)\theta\left(t - t_j^{rec}\right) \qquad (4)$$

Here, in order to simplify the notation, the spike indices are rearranged in order from the earliest firing time. That is to say, indices 1, 2, . . . , N are used so as to satisfy equation (5).

[Equation 5]

$$t_1^{rec} \leq t_2^{rec} \leq \ldots \leq t_N^{rec} \qquad (5)$$

Because the rearranged indices and the original indices are associated one-to-one, it is easy to restore the original index display from the rearranged index display. Under the rearranged index display, the two times $t_1$ and $t_2$ are arbitrary times that satisfy equation (6).

[Equation 6]

$$t_k^{rec} \leq t_1 \leq t_2 \leq t_{k+1}^{rec}, \; k=1, 2, \ldots, N-1 \qquad (6)$$

In this case, the condition that the membrane potential v is represented by a broadly defined monotonically increasing function is represented by equation (7).

[Equation 7]

$$v(t_1) \leq v(t_2) \qquad (7)$$

In the case of a strictly monotonic increase, "$t_1 \leq t_2$," in equation (6) is replaced with "$t_1 < t_2$," and "$v(t_1) \leq v(t_2)$" is in equation (7) is replaced with "$v(t_1) < v(t_2)$".

The condition that the membrane potential v is represented by a broadly defined monotonically decreasing function is represented by equation (8).

[Equation 8]

$$v(t_1) \geq v(t_2) \tag{8}$$

In the case of a strictly monotonic increase, "$t_1 \leq t_2$," in equation (6) is replaced with "$t_1 < t_2$," and "$v(t_1) \geq v(t_2)$" in equation (8) is replaced with "$v(t_1) > v(t_2)$".

The membrane potential v when the target spiking neuron receives the kth spike can be expressed as in equation (9) by substituting $t^{rec}_k$ for t in equation (4).

[Equation 9]

$$v[k] = v(t^{rec}_k) = \sum_{j=1}^{k-1} w_j(t^{rec}_k - t^{rec}_j), k = 1, 2, \ldots, N \tag{9}$$

As shown in equation (9), $v(t^{rec}_k)$, that is to say, the membrane potential v at the arrival timing $t^{rec}_k$ of the kth spike, is also denoted as $v[k]$.

Furthermore, here ws is defined as in equation (10).

[Equation 10]

$$ws[k] := \sum_{j=1}^{k-1} w_j, k = 1, 2, \ldots, N \tag{10}$$

Here, ":=" indicates a defining expression.
Furthermore, wts is defined as in equation (11).

[Equation 11]

$$wts[k] := \sum_{j=1}^{k} w_j t^{rec}_j, k = 1, 2, \ldots, N \tag{11}$$

Using ws[k], ws[k+1] can be efficiently calculated as in equation (12).

[Equation 12]

$$ws[k+1] = ws[k] + w_{k+1}, k = 1, 2, \ldots, N-1 \tag{12}$$

Using wts[k], wts[k+1] can be efficiently calculated as in equation (13).

[Equation 13]

$$wts[k+1] = wts[k] + w_{k+1} t_{k+1}^{rec}, k = 1, 2, \ldots, N-1 \tag{13}$$

From equations (9), (10), and (11), the membrane potential v[k] is expressed as in equation (14) using ws and wts.

[Equation 14]

$$v[k] = t_k^{rec} \cdot ws[k-1] - wts[k-1], k = 1, 2, \ldots, N \tag{14}$$

Here, the membrane potential v is monotonic in the time segment $[t^{rec}_k, t^{rec}_{k+1}]$ from time $t^{rec}_k$ to time $t^{rec}_{k+1}$ for an arbitrary integer k that satisfies $1 \leq k \leq N-1$. Therefore, a necessary and sufficient condition for the spiking neuron to fire within this time segment can be expressed as in equation (15).

[Equation 15]

$$v[k] \leq V_{th} \leq v[k+1] \tag{15}$$

A spiking neuron fires when the membrane potential v reaches the threshold from a state where it is smaller than the threshold. Therefore, as shown in equation (15), the spiking neuron fires in a time segment in which the membrane potential v monotonically increases.

FIG. 6 is a diagram showing an example where the time evolution of a membrane potential is monotonic within each time segment. The horizontal axis of the graph in FIG. 6 represents time, and the vertical axis represents the potential.

$V_{th}$ represents the threshold of the membrane potential. The line L1 represents the membrane potential.

The time $t^{rec}_{k-1}$ represents the (k−1)th arrival timing among the spike arrival timings from the preceding level spiking neurons. The membrane potential v[k−1] represents the membrane potential of the target spiking neuron at the (k−1)th arrival timing.

The time $t^{rec}_k$ represents the kth arrival timing among the spike arrival timings from the preceding level spiking neurons. The membrane potential v[k] represents the membrane potential of the target spiking neuron at the kth arrival timing.

The time $t^{rec}_{k+1}$ represents the (k+1)th arrival timing among the spike arrival timings from the preceding level spiking neurons. The membrane potential v[k+1] represents the membrane potential of the target spiking neuron at the (k+1)th arrival timing.

In the example of FIG. 6, the membrane potentials from v[1] to v[k] at each time from time $t^{rec}_1$ to $t^{rec}_k$ are all lower (smaller) than the threshold $V_{th}$. On the other hand, the membrane potential v[k+1] at time $t^{rec}_{k+1}$ is higher (larger) than the threshold $V_{th}$. According to the intermediate value theorem, there exists a time within the time segment $[t^{rec}_k, t^{rec}_{k+1}]$ from time $t^{rec}_k$ to $t^{rec}_{k+1}$ in which the membrane potential becomes equal to the threshold $V_{th}$, that is to say, a firing timing $t^{fir}$ of the target spiking neuron.

The firing timing calculation unit 13 may specify the first arrival timing $t^{rec}_{k+1}$ at which the membrane potential v becomes higher than the threshold $V_{th}$ by comparing the membrane potentials v[1], v[2], . . . , with the threshold $V_{th}$ in order of the spike arrival timings $t^{rec}_1, t^{rec}_2, \ldots$, from the preceding level spiking neurons. As a result, the firing timing calculation unit 13 is capable of specifying that the time segment that includes the firing timing of the target spiking neuron is the time segment $[t^{rec}_k, t^{rec}_{k+1}]$ from the kth arrival timing $t^{rec}_k$ of the preceding level spike neurons to the (k+1)th arrival timing $t^{rec}_{k+1}$.

FIG. 6 shows a case where the membrane potential v is not reset after the membrane potential v reaches the threshold $V_{th}$. If a condition is provided that ensures a single spiking neuron fires at most once, there is no need to determine whether or not the spiking neuron will fire a second or subsequent time. Therefore, it is not necessary to reset the membrane potential v.

On the other hand, if a single spiking neuron can fire two or more times, the firing timing calculation unit 13 may subtract the potential corresponding to the threshold $V_{th}$ from the membrane potential v at the time at which it is determined that the membrane potential v has reached the threshold $V_{th}$.

In the example of FIG. 6, the firing timing calculation unit 13 determines that the membrane potential v[k+1] at time $t^{rec}_{k+1}$ has reached the threshold $V_{th}$ (v[k+1]≥$V_{th}$). At this time, the firing timing calculation unit 13 may subtract the threshold $V_{th}$ from the membrane potential v[k+1] at time $t^{rec}_{k+1}$ (v[k+1]:=v[k+1]−$V_{th}$). Then, the firing timing calculation unit 13 may calculate v[k+2], v[k+3], . . . , based on the value of v[k+1] after subtracting the threshold $V_{th}$.

Alternatively, a threshold $mV_{th}$, with m=1, 2, . . . , may be set. Then, when the membrane potential v reaches the threshold $mV_{th}$, the firing timing calculation unit 13 may treat the target spiking neuron as firing for the mth time.

When the membrane potential in the time segment [$t^{rec}_{k}$, $t^{rec}_{k+1}$] from time $t^{rec}_{k}$ to time $t^{rec}_{k+1}$ is represented by a linear function of time, if a value of k is found that satisfies equation (15), equation (16) is obtained using equation (4) with respect to the firing timing $t^{fir}$ of the target spiking neuron.

[Equation 16]

$$V_{th} = \sum_{j=1}^{k} w_j \left( t^{fir} - t^{rec}_j \right) \quad (16)$$

After solving equation (16), the firing timing $t^{fir}$ of the target spiking neuron can be calculated by equation (17).

[Equation 17]

$$t^{fir} = \frac{V_{th} + wts[k]}{ws[k]} \quad (17)$$

(Abbreviated Method for Firing Timing Calculation of Neural Network Device According to Example Embodiment)

A method of efficiently calculating a value of k that satisfies equation (15) for identifying the time segment containing the firing timing $t^{fir}$ will be described. Based on equations (12) to (14), it can be seen that the membrane potentials satisfy equation (18).

[Equation 18]

$$
\begin{aligned}
v[k+1] - v[k] &= t^{rec}_{k+1} \cdot ws[k] - t^{rec}_k \cdot ws[k-1] - (wts[k] - wts[k-1]) \quad (18) \\
&= t^{rec}_{k+1} \cdot ws[k] - t^{rec}_k \cdot ws[k-1] - w_k t^{rec}_k \\
&= t^{rec}_{k+1} \cdot ws[k] - t^{rec}_k (ws[k-1] + w_k) \\
&= t^{rec}_{k+1} \cdot ws[k] - t^{rec}_k ws[k] \\
&= (t^{rec}_{k+1} - t^{rec}_k) ws[k]
\end{aligned}
$$

Here, since 0≤$t^{rec}_{k+1}$−$t^{rec}_k$, if ws[k]≤0 then v[k+1]≤v[k], which means that equation (15), which is a conditional expression for firing, is not satisfied. Then, when the firing timing calculation unit 13 determines the sign of ws[k] and determines that ws[k]≤0, the determination of whether or not equation (15) is satisfied for that value of k may be omitted. In this case, the firing timing calculation unit 13 can omit the calculation of v[k+1] using equation (14).

(Operation of Neural Network According to Example Embodiment)

Figure 7:
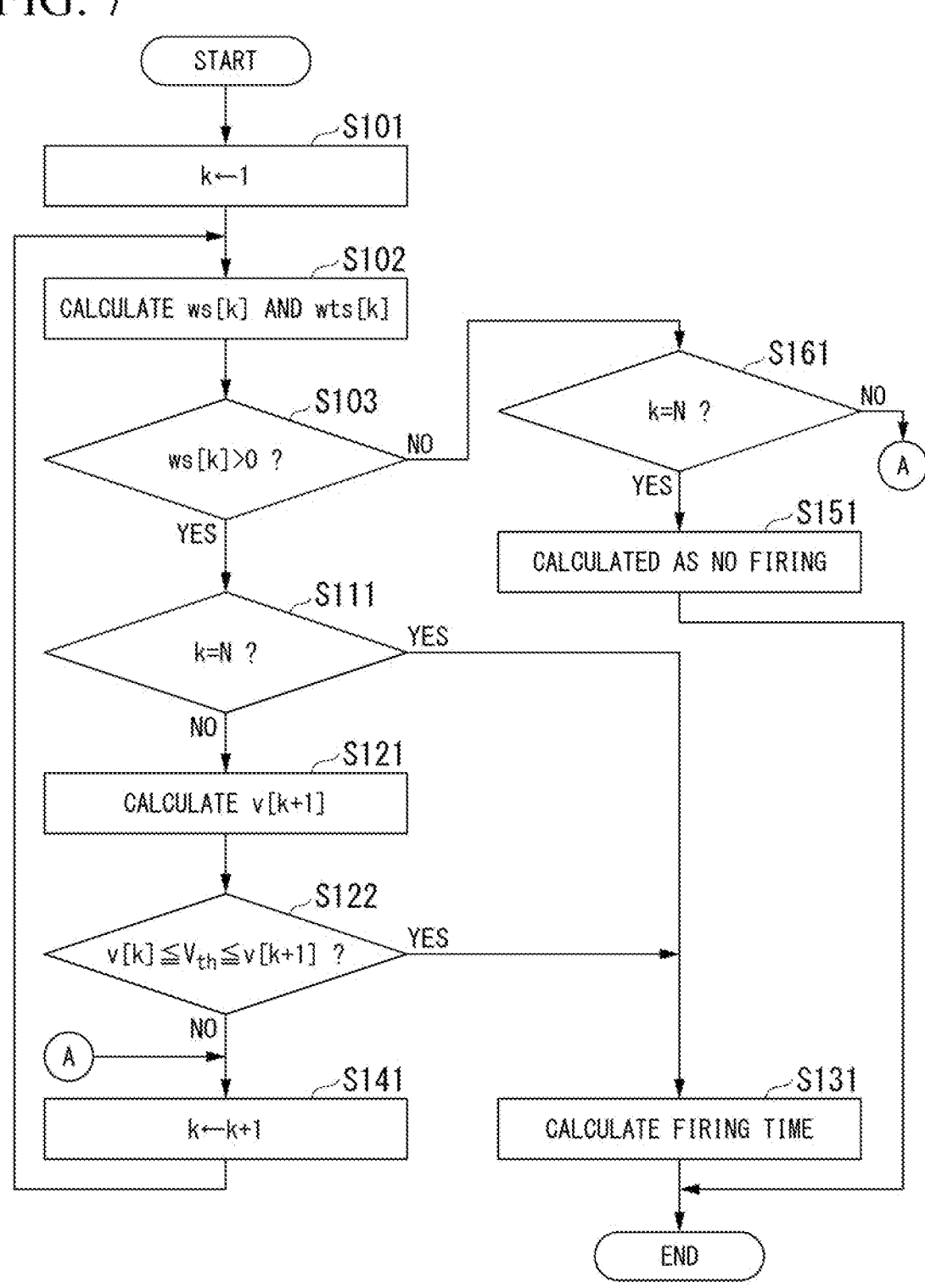
FIG. 7 is a flowchart showing an example of a processing sequence in which a neural network device according to the example embodiment calculates the firing timing of a target spiking neuron.

FIG. 7 is a flowchart showing an example of a processing sequence in which the neural network device 10 calculates the firing timing of the target spiking neuron.

12

(Step S101)

The firing timing calculation unit 13 sets the value of the index k of the spike arrival timing to 1. The symbol "←" represents assignment.

(Step S102)

The firing timing calculation unit 13 calculates the value of ws[k] and the value of wts[k].

When the neural network device 10 is executing calculations for a plurality of spiking neurons in parallel and the kth spike has not yet reached the target spiking neuron, the firing timing calculation unit 13 can perform the processing of step S102 after waiting for arrival of the kth spike.

When k≥2, that is to say, in the second or subsequent execution of step S102, as shown in equation (12) and equation (13) above, the firing timing calculation unit 13 uses the calculation result of the previous processing of step S102 to efficiently perform the calculation.

(Step S103)

The firing timing calculation unit 13 determines whether or not the value of ws[k] calculated in step S102 is greater than 0. This is because, as mentioned above, when ws[k]≤0, the determination of whether or not equation (15) is satisfied can be omitted.

If it is determined that ws[k]>0 (step S103: YES), the processing proceeds to step S111.

If it is determined that ws[k]≤0 (step S103: NO), the processing proceeds to step S161.

(Step S111)

The firing timing calculation unit 13 determines whether or not k=N. That is to say, the firing timing calculation unit 13 determines whether or not a predetermined number of spikes have all arrived at the target spiking neuron.

When N is the number of connections with the preceding level spiking neurons, and there are spiking neurons among the preceding level spiking neuron that have been confirmed as not firing, the firing timing calculation unit 13 may decrease the value of N by 1 (N:=N−1) each time one of the preceding level spiking neurons is confirmed as not firing.

If the firing timing calculation unit 13 determines that k≠N (step S111: NO), the processing proceeds to step S121.

If the firing timing calculation unit 13 determines that k=N (step S111: YES), the processing proceeds to step S131.

(Step S121)

The firing timing calculation unit 13 calculates v[k+1].

As shown in equation (14) above, the firing timing calculation unit 13 can efficiently calculate v[k+1] using ws[k] and wts[k].

When the neural network device 10 is executing calculations for a plurality of spiking neurons in parallel and the (k+1)th spike has not yet reached the target spiking neuron, the firing timing calculation unit 13 can perform the processing of step S121 after waiting for arrival of the (k+1)th spike.

(Step S122)

The firing timing calculation unit 13 determines whether or not the target spiking neuron fires in the time segment [$t^{rec}_{k}$, $t^{rec}_{k+1}$] from time $t^{rec}_{k}$ to time $t^{rec}_{k+1}$. Specifically, the firing timing calculation unit 13 determines whether or not v[k]≤$V_{th}$≤v[k+1] shown in equation (15) above holds.

When the firing timing calculation unit 13 performs the processing of step S122, the target spiking neuron has not fired by time $t^{rec}_{k}$, so v[k]≤$V_{th}$ holds. Therefore, the firing timing calculation unit 13 only needs to determine whether or not the right inequality of equation (15) holds, that is to say, whether or not $V_{th}$≤v[k+1] holds.

If it is determined that v[k]≤Vth≤v[k+1] holds (step S122: YES), the processing proceeds to step S131.

If it is determined that $v[k] \leq Vth \leq v[k+1]$ does not hold (step S122: NO), the processing proceeds to step S141.

(Step S131)

The firing timing calculation unit 13 calculates and outputs the firing timing of the target spiking neuron in the time segment $[t^{rec}_k, t^{rec}_{k+1}]$ from time $t^{rec}_k$ to time $t^{rec}_{k+1}$.

When the processing proceeds to step S131 from step S122: YES, in the same manner as described with reference to FIG. 6, according to the intermediate value theorem, the firing timing $t^{fir}$ of the target spiking neuron exists within the time segment $[t^{rec}_k, t^{rec}_{k+1}]$ from time $t^{rec}_k$ to $t^{rec}_{k+1}$.

When the membrane potential of the target spiking neuron in the time segment time segment $[t^{rec}_k, t^{rec}_{k+1}]$ from time $t^{rec}_k$ to time $t^{rec}_{k+1}$ is represented by a linear function of time, the firing timing calculation unit 13 can calculate the firing timing using equation (17) above.

When the processing proceeds to step S131 from step S111: YES, ws[N]>0 holds because of step S103: YES. Therefore, after time $t^{rec}_N$, the membrane potential of the target spiking neuron represents a monotonic increase. Furthermore, the target spiking neuron has not fired by time $t^{rec}N$, and $v[N] < V_{th}$ holds. As a result, the membrane potential $v[N]$ of the target spiking neuron reaches the threshold $V_{th}$ at a certain time after time $t^{rec}_N$. That is to say, the firing timing $t^{fir}$ of the target spiking neuron always exists after time $t^{rec}_N$.

When the membrane potential of the target spiking neuron after time $t^{rec}_N$ is represented by a linear function of time, the firing timing calculation unit 13 can calculate the firing timing $t^{fir}$ using equation (17) above.

For example, the firing timing calculation unit 13 calculates the difference $V_{th} - V[N]$ between the membrane potential at time $t^{rec}_N$ and the threshold. Then, the firing timing calculation unit 13 divides the calculated difference $V_{th} - v[N]$ by the amount of increase in the membrane potential per unit time $dv(t)/dt$ after time $t^{rec}_N$, and thereby calculates the time $t^{diff}$ required for the membrane potential to increase by the difference $V_{th} - v[N]$. Then, the firing timing calculation unit 13 adds the calculated time $t^{diff}$ to the time $t^{rec}_N$, and thereby calculates $t^{fir} = t^{rec}_N + t^{diff}$.

After step S131, the neural network device 10 ends the processing of FIG. 7.

(Step S141)

The firing timing calculation unit 13 increases the value of the index k by 1.

After step S141, the processing returns to step S102.

(Step S151)

The firing timing calculation unit 13 calculates a no firing result for the target spiking neuron. Therefore, the firing timing calculation unit 13 outputs information indicating no firing as the calculation result of the firing timing of the target spiking neuron.

When the processing proceeds to step S151, ws[N]≤0 holds because of step S103: NO. Therefore, after time $t^{rec}_N$, the membrane potential of the target spiking neuron represents a monotonic decrease (at least a broadly defined monotonic decrease). Furthermore, the target spiking neuron has not fired by time $t^{rec}_N$, and $v[N] < V_{th}$ holds. As a result, the membrane potential $v[N]$ of the target spiking neuron does not reach the threshold value $V_{th}$ even after time $t^{rec}_N$, and the target spiking neuron does not fire.

After step S151, the neural network device 10 ends the processing of FIG. 7.

(Step S161)

The firing timing calculation unit 13 determines whether or not k=N.

If the firing timing calculation unit 13 determines that k=N (step S161: YES), the processing proceeds to step S151.

If the firing timing calculation unit 13 determines that k≠N (step S161: NO), the processing proceeds to step S141.

Effects According to Example Embodiment

As described above, in the spiking neuron, the membrane potential in the time from when a spike is received to when the next spike is received is represented by a monotonic function of time, and the firing conditions are represented by a comparison between the membrane potential and a threshold. The firing timing calculation unit 13 narrows down, from among respective time segments from when a spike is received to when the next spike is received, candidates of time segments that include a firing timing of the target spiking neuron.

According to the neural network device 10, the time segments for which the firing timing is to be calculated can be narrowed down. In this respect, the calculation load of the firing timing of the target spiking neuron can be relatively lightened.

For example, when the neural network device 10 narrows down the time segments subjected to calculation of the firing timing to a single time segment, the processing that calculates the firing timing within that time segment only needs to be performed once. Further, for example, when the processing that calculates the firing time includes division, the division only needs to be performed once. When the processing of the neural network device 10 is performed by a hardware calculation, the division circuit can be made small, and the circuit area can be relatively small.

Furthermore, the firing timing calculation unit 13 specifies, from among the time segments, the time segment that includes the firing timing of the target spiking neuron based on a comparison between the membrane potential at each time the spiking neuron receives a spike and the threshold.

According to the neural network device 10, at the stage of narrowing down the candidates of the time segment, it is sufficient to calculate the membrane potential at each time the spiking neuron receives a spike. Therefore, for those time segments that have been excluded from the candidates that include the firing timing, after the spiking neuron receives the spike, it is not necessary for the membrane potential to be calculated in the period before receiving the next spike. In this respect, according to the neural network device 10, the calculation load of the firing timing of the target spiking neuron can be relatively lightened.

Moreover, the firing timing calculation unit 13 calculates the membrane potential at each time the spiking neuron receives a spike using a series relating to the weighting coefficients (connection weights) of all of the spikes received until the spiking neuron receives the spike subjected to the membrane potential calculation.

The neural network device 10 can use the values of the series calculated when the spiking neuron previously received the spike when determining the values of the series relating to the weighting coefficients. In this respect, according to the neural network device 10, the calculation load of the firing timing of the target spiking neuron can be relatively lightened.

In addition, the firing timing calculation unit 13 specifies the time segments that do not include the firing timing based on whether or not the sum of the weighting coefficients (connection weights) of all of the spikes received by the spiking neuron until a certain spike is received is positive.

The neural network device 10 can specify the time segments that do not include the firing timing and exclude the time segments that do not include the firing timing from the candidates by a simple calculation that calculates the sum of the weighting coefficients, and simple processing that determines whether or not the calculated sum is positive. In this respect, according to the neural network device 10, the calculation load of the firing timing of the target spiking neuron can be relatively lightened.

Further, the neural network device 10 can use the sum of the weighting coefficients calculated when the spiking neuron previously received the spike when calculating the sum of the weighting coefficients. In this respect, according to the neural network device 10, the calculation load of the firing timing of the target spiking neuron can be further lightened.

Furthermore, the monotonic function of time that represents the membrane potential from the time the spiking neuron receives a spike to the time it receives the next spike is a linear function of time. The firing timing calculation unit 13 calculates the firing timing based on the threshold $V_{th}$, the sum ws[k] of the weighting coefficients of all of the spikes received up to the start time $t^{rec}_{k}$ of the time segment determined to include the firing timing $t^{fir}$ of the target spiking neuron, and the sum wts[k] of the product obtained for each spike received up to the start time $t^{rec}$k from the weighting coefficient of the spike and the arrival timing of the spike.

The neural network device 10 can calculate the firing timing by a simple calculation using these values. Furthermore, as described above, the value of ws[k] and the value of wts[k] can be easily calculated as a series. In this respect, according to the neural network device 10, the calculation load of the firing timing of the target spiking neuron can be relatively lightened.

Figure 8:
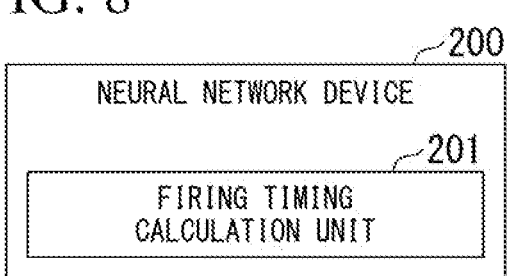
FIG. 8 is a diagram showing a configuration example of a neural network device according to an example embodiment.

FIG. 8 is a diagram showing a configuration example of a neural network device according to an example embodiment. In the configuration shown in FIG. 8, the neural network device 200 includes a firing timing calculation unit 201. In this configuration, the firing timing calculation unit 201 narrows down, from among time segments from when a spike is received to when a next spike is received, candidates of time segments that include a firing timing of a spiking neuron, for which a membrane potential, during a period from when a spike is received to when a next spike is received, is represented by a monotonic function of time, and firing conditions are represented by a comparison between the membrane potential and a threshold.

The firing timing calculation unit 201 corresponds to an example of a firing timing calculation means.

According to the neural network device 200, the time segment for which the firing timings are to be calculated can be narrowed down. In this respect, the calculation load of the firing timing of the spiking neuron can be relatively lightened.

For example, when the neural network device 200 narrows down the time segments subjected to calculation of the firing timing to a single time segment, the processing that calculates the firing timing within that time segment only needs to be performed once. Further, for example, when the processing that calculates the firing time includes division, the division only needs to be performed once. When the processing of the neural network device 200 is performed by a hardware calculation, the division circuit can be made small, and the circuit area can be relatively small.

Figure 9:
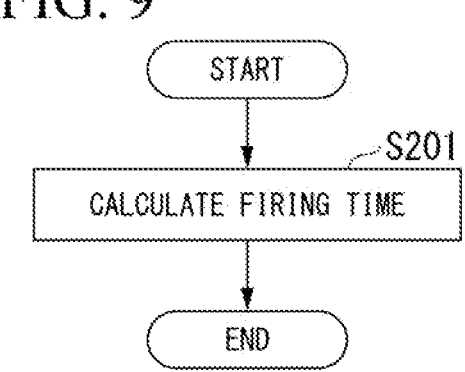
FIG. 9 is a diagram showing an example of the processing sequence of a firing timing calculation method according to an example embodiment.

FIG. 9 is a diagram showing an example of the processing sequence of a firing timing calculation method according to an example embodiment.

The firing timing calculation method shown in FIG. 9 includes a step for calculating a firing timing (step S201).

The step for calculating a firing timing (step S201) narrows down, from among time segments from when a spike is received to when a next spike is received, candidates of time segments that include a firing timing of a spiking neuron, for which a membrane potential, during a period from when a spike is received to when a next spike is received, is represented by a monotonic function of time, and firing conditions are represented by a comparison between the membrane potential and a threshold.

In the firing timing calculation method shown in FIG. 9, the time segments for which the firing timing are to be calculated can be narrowed down. In this respect, the calculation load of the firing timing of the spiking neuron can be relatively lightened.

For example, in the firing timing calculation method shown in FIG. 9, when the time segments subjected to calculation of the firing timing are narrowed down to a single time segment, the processing that calculates the firing timing within that time segment only needs to be performed once.

All or part of the neural network device 10 and the neural network device 200 may be implemented by dedicated hardware.

Figure 10:
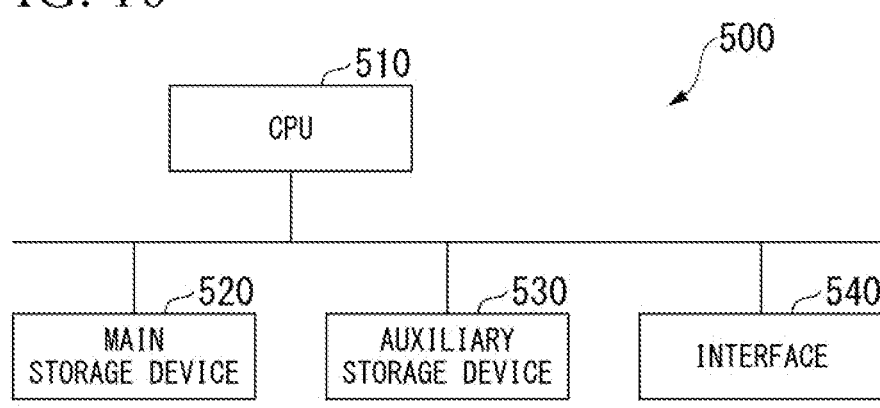
FIG. 10 is a schematic block diagram showing a configuration example of dedicated hardware according to at least one example embodiment.
Figure 11:
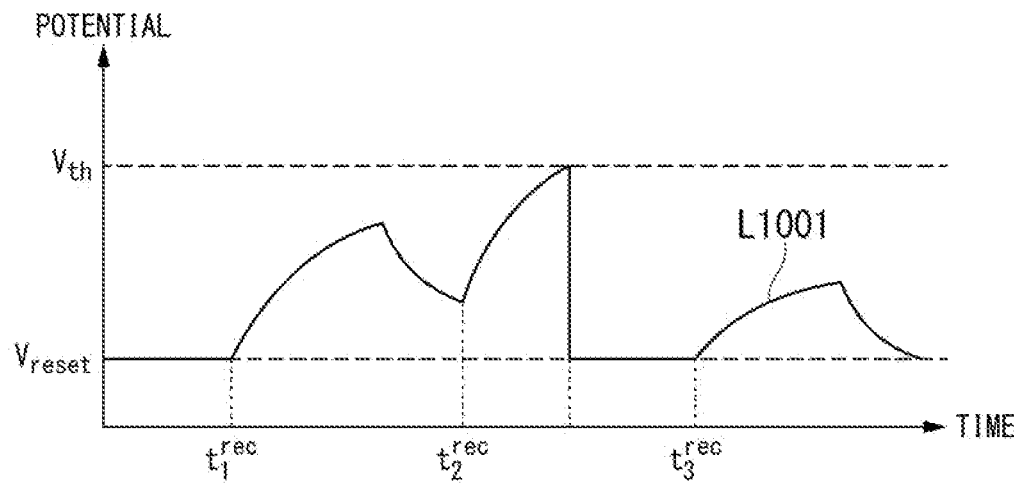
FIG. 11 is a diagram showing an example of the relationship between the time evolution of the membrane potential of a spiking neuron and a threshold.

FIG. 10 is a schematic block diagram showing a configuration example of dedicated hardware according to at least one example embodiment. In the configuration shown in FIG. 10, the dedicated hardware 500 includes a CPU 510, a main storage device 520, an auxiliary storage device 530, and an interface 540.

When the neural network device 10 is implemented by the dedicated hardware 500, the operation of the computation unit 12 and each unit thereof is stored in the auxiliary storage device 530 in the form of a program. The CPU 510 reads the program from the auxiliary storage device 530, expands the program in the main storage device 520, and executes the processing described above according to the program.

Furthermore, the CPU 510 secures a storage area corresponding to the model storage unit 11 in the main storage device 520 according to the program.

The communication of the neural network device 10 with other devices is executed as a result of the interface 540 having a communication function, and performing communication according to the control of the CPU 510.

When the neural network device 200 is implemented by the dedicated hardware 500, the operation of the firing timing calculation unit 201 is stored in the auxiliary storage device 530 in the form of a program. The CPU 510 reads the program from the auxiliary storage device 530, expands the program in the main storage device 520, and executes the processing described above according to the program.

A personal computer (PC) or general purpose hardware such as a graphical processing unit (GPU) may be used in addition to, or instead of, the dedicated hardware 500. The processing in this case is the same as the processing in the case of the dedicated hardware 500 described above.

A program for executing some or all of the processing performed by the neural network device 10 and the neural network device 200 may be recorded in a computer-readable recording medium, and the processing of each unit may be performed by a computer system reading and executing the program recorded on the recording medium. The "computer system" referred to here is assumed to include an OS and hardware such as a peripheral device.

Furthermore, the "computer-readable recording medium" refers to a portable medium such as a flexible disk, a magnetic optical disk, a ROM (Read Only Memory), or a CD-ROM (Compact Disc Read Only Memory), or a storage device such as a hard disk built into the computer system. Moreover, the program may be one capable of realizing some of the functions described above. In addition, the functions described above may be realized in combination with a program already recorded in the computer system.

Example embodiments of the present invention has been described in detail above with reference to the drawings. However, specific configurations are in no way limited to the example embodiments, and include designs and the like within a scope not departing from the spirit of the present invention.

DESCRIPTION OF REFERENCE SYMBOLS 10, 200 Neural network device
11 Model storage unit
12 Computation unit
13, 201 Firing timing calculation unit
This application is based upon and claims the benefit of priority from Japanese patent application No. 2020-124065, filed Jul. 20, 2020, the disclosure of which is incorporated herein in its entirety.

INDUSTRIAL APPLICABILITY

The present invention may be applied to a neural network device, a firing timing calculation method, and a recording medium.

The invention claimed is:

1. A neural network device comprising:
a memory configured to store instructions; and
a processor configured to execute the instructions to:
    narrow down, from among respective time segments from when a spike is received to when a next spike is received, a candidate of a time segment including a firing timing of a spiking neuron, a membrane potential of the spiking neuron during a period from when a spike is received to when a next spike is received being represented by a monotonic function of time, a firing condition of the spiking neuron being represented by a comparison between the membrane potential and a threshold.

2. The neural network device according to claim 1, wherein the processor is configured to execute the instructions to: specify, from among the time segments, a time segment that includes the firing timing of the spiking neuron, based on a comparison between the membrane potential at each time the spiking neuron receives a spike and the threshold.

3. The neural network device according to claim 2, wherein the processor is configured to execute the instructions to: calculate the membrane potential at each time the spiking neuron receives the spike using a series relating to weighting coefficients of all spikes received until the spiking neuron receives a spike subjected to a membrane potential calculation.

4. The neural network device according to claim 1, wherein the processor is configured to execute the instructions to: specify a time segment that does not include the firing timing based on whether or not a sum of weighting coefficients of all spikes received by the spiking neuron until a certain spike is received is positive.

5. The neural network device according to claim 1, wherein the monotonic function is a linear function of time, and
the processor is configured to execute the instructions to: calculate the firing timing based on: the threshold; a sum of weighting coefficients of all of spikes received up to a start time of a time segment determined to include the firing timing of the spiking neuron; and a sum of a product for each spike received up to the start time, the product being a product of a weighting coefficient of the spike and an arrival timing of the spike.

6. A firing timing calculation method comprising:
narrowing down, from among respective time segments from when a spike is received to when a next spike is received, a candidate of a time segment including a firing timing of a spiking neuron, a membrane potential of the spiking neuron during a period from when a spike is received to when a next spike is received being represented by a monotonic function of time, a firing condition of the spiking neuron being represented by a comparison between the membrane potential and a threshold.

7. A non-transitory recording medium that stores a program for causing a computer to execute:
narrowing down, from among respective time segments from when a spike is received to when a next spike is received, a candidate of a time segment including a firing timing of a spiking neuron, a membrane potential of the spiking neuron during a period from when a spike is received to when a next spike is received being represented by a monotonic function of time, a firing condition of the spiking neuron being represented by a comparison between the membrane potential and a threshold.

* * * * *